(12) United States Patent
Burke et al.

(10) Patent No.: US 9,583,100 B2
(45) Date of Patent: Feb. 28, 2017

(54) CENTRALIZED SPEECH LOGGER ANALYSIS

(75) Inventors: Denis R. Burke, Canton, MI (US); Danilo Gurovich, Grosse Pointe Farms, MI (US); Daniel E. Rudman, West Bloomfield, MI (US); Keith A. Fry, Rochester Hills, MI (US); Shane M. McCutchen, Howell, MI (US); Marco T. Carnevale, Windsor (CA); Mukesh Gupta, Farmington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 446 days.

(21) Appl. No.: 13/604,246

(22) Filed: Sep. 5, 2012

(65) Prior Publication Data

US 2014/0067392 A1   Mar. 6, 2014

(51) Int. Cl.
| | | |
|---|---|---|
| *G10L 15/00* | (2013.01) | |
| *G10L 21/00* | (2013.01) | |
| *G10L 15/06* | (2013.01) | |
| *G10L 15/26* | (2006.01) | |
| *G10L 15/22* | (2006.01) | |
| *G10L 15/30* | (2013.01) | |

(52) U.S. Cl.
CPC .............. *G10L 15/22* (2013.01); *G10L 15/30* (2013.01); *G10L 2015/228* (2013.01)

(58) Field of Classification Search
CPC ... G10L 2015/228; G10L 15/30; G10L 15/22; G10L 15/00; G10L 21/00; G10L 15/06; G10L 15/26
USPC ........ 704/236–242, 246–255, 235, 270, 275, 704/231; 705/236–242, 246–255
See application file for complete search history.

(56) References Cited

U.S. PATENT DOCUMENTS

| | | | |
|---|---|---|---|
| 6,487,534 B1 | 11/2002 | Thelen et al. | |
| 7,139,715 B2 * | 11/2006 | Dragosh | G10L 15/30 704/270.1 |
| 7,212,970 B2 | 5/2007 | Rodrigo | |
| 7,228,275 B1 | 6/2007 | Endo et al. | |
| 7,328,155 B2 * | 2/2008 | Endo | G10L 15/08 704/251 |

(Continued)

FOREIGN PATENT DOCUMENTS

WO    WO0058942 A2    10/2000

OTHER PUBLICATIONS

General Mortors LLC, "2011 Chevrolet Impala Owner Manual BookTOC", General Motors LLC., 2010.*

(Continued)

*Primary Examiner* — Pierre-Louis Desir
*Assistant Examiner* — Seong Ah A Shin
(74) *Attorney, Agent, or Firm* — Christopher DeVries; Reising Ethington P.C.

(57) ABSTRACT

A method of providing hands-free services using a mobile device having wireless access to computer-based services includes receiving speech in a vehicle from a vehicle occupant; recording the speech using a mobile device; transmitting the recorded speech from the mobile device to a cloud speech service; receiving automatic speech recognition (ASR) results from the cloud speech service at the mobile device; and comparing the recorded speech with the received ASR results at the mobile device to identify one or more error conditions.

20 Claims, 12 Drawing Sheets

(56) References Cited

U.S. PATENT DOCUMENTS

| | | | | |
|---|---|---|---|---|
| 7,349,722 B2* | 3/2008 | Witkowski | G07C 5/008 | |
| | | | 455/41.2 | |
| 7,716,051 B2 | 5/2010 | Dow et al. | | |
| 8,249,877 B2* | 8/2012 | Koll | G10L 15/30 | |
| | | | 379/88.01 | |
| 8,521,539 B1* | 8/2013 | Teng | G01C 21/3608 | |
| | | | 701/418 | |
| 8,521,766 B1 | 8/2013 | Hoarty | | |
| 8,762,152 B2 | 6/2014 | Bennett et al. | | |
| 8,949,266 B2* | 2/2015 | Phillips | G10L 15/30 | |
| | | | 704/7 | |
| 2005/0080632 A1 | 4/2005 | Endo et al. | | |
| 2006/0080105 A1* | 4/2006 | Lee | G10L 15/30 | |
| | | | 704/270.1 | |
| 2007/0027693 A1* | 2/2007 | Hanazawa | G10L 15/32 | |
| | | | 704/275 | |
| 2007/0276651 A1* | 11/2007 | Bliss | G10L 15/30 | |
| | | | 704/9 | |
| 2008/0167860 A1* | 7/2008 | Goller | G06F 8/65 | |
| | | | 704/201 | |
| 2008/0212820 A1* | 9/2008 | Park | H04B 1/034 | |
| | | | 381/370 | |
| 2010/0057450 A1* | 3/2010 | Koll | G10L 15/32 | |
| | | | 704/231 | |
| 2010/0161328 A1 | 6/2010 | Krumel et al. | | |
| 2011/0010174 A1* | 1/2011 | Longe | G10L 15/24 | |
| | | | 704/235 | |
| 2011/0054896 A1* | 3/2011 | Phillips | G10L 15/30 | |
| | | | 704/235 | |
| 2011/0144973 A1* | 6/2011 | Bocchieri | G06F 17/289 | |
| | | | 704/2 | |
| 2012/0179471 A1* | 7/2012 | Newman | G10L 15/30 | |
| | | | 704/270.1 | |
| 2012/0215539 A1* | 8/2012 | Juneja | G10L 15/30 | |
| | | | 704/254 | |
| 2012/0245944 A1* | 9/2012 | Gruber | G06F 17/3087 | |
| | | | 704/270.1 | |
| 2013/0030804 A1* | 1/2013 | Zavaliagkos | G10L 15/26 | |
| | | | 704/235 | |
| 2013/0096925 A1* | 4/2013 | Paik | G06F 17/30769 | |
| | | | 704/275 | |
| 2013/0132086 A1* | 5/2013 | Xu | G10L 15/01 | |
| | | | 704/257 | |
| 2013/0132089 A1* | 5/2013 | Fanty | G10L 21/00 | |
| | | | 704/270 | |
| 2013/0346078 A1* | 12/2013 | Gruenstein | G10L 15/26 | |
| | | | 704/235 | |

OTHER PUBLICATIONS

Wang, Ye-Yi., et al. "Combination of Statistical and Rule-Based Approaches for Spoken Language Understanding", International Conference of Spoken Language Processing, Denver, Colorado, 2002, 4 pages.

USPTO Office Action for U.S. Appl. No. 14/515,933, dated Feb. 3, 2016, 13 pages.

* cited by examiner

CENTRALIZED SPEECH LOGGER ANALYSIS

TECHNICAL FIELD

The present invention relates to speech interfaces to computer-based services obtained wirelessly from a cellular phone or other mobile device, and to such interfaces implemented in a vehicle such as a passenger car.

BACKGROUND

Speech-based human-machine interfaces (HMI) to vehicle functions and cellular phone functions and applications typically involve an application-specific or function-specific limited command set that requires syntactically constrained interactions between the user and HMI. In these systems, inputted speech may be converted into a specific command for a specific application, but there is typically only limited ability to identify and carry out different services involving different applications or service providers.

In the realm of cellular phone use in vehicles, systems have been proposed and some implemented that help reduce driver distraction by providing a hands-free telephony experience as well as carry out some basic vehicle control tasks, such as selecting and controlling radio and other infotainment services on the vehicle. In some systems, this is done using an embedded cellular phone that has access to at least portions of the vehicle electronics so as to permit control and reporting via a speech user interface. In other vehicles, the driver or other occupant's personal mobile device (e.g., cellular phone) is used for this purpose, with the vehicle providing a basic audio interface that includes a microphone and one or more speakers, as well as a Bluetooth or other wireless connection to the mobile device. This permits speech and other audio to be sent between the audio interface and mobile device in either direction. However, these systems are typically limited to only enabling a few basic mobile device functions such as calling and controlling music selection and playback. They do not provide access to the many other built-in and user added applications and functions typically available today.

For example, there is now widespread availability and use of mobile devices such as smartphones that permit user downloading and installing of relatively small software applications (apps). Some of these smartphones have built-in speech support, either via the operating system (OS), such as in the case of the Android™ OS, or via a built-in app such as Siri™ available on the iPhone4S™. See, for example, WO2011088053 published Jul. 21, 2011. While providing a greater level of integration, these commercially-available systems are not configured to provide a fully hands-free experience with the mobile device since they still rely heavily on the screen to interact with the user during the speech session.

SUMMARY

According to an aspect of the invention, a method of providing hands-free services using a mobile device having wireless access to computer-based services includes receiving speech in a vehicle from a vehicle occupant; recording the speech using a mobile device; transmitting the recorded speech from the mobile device to a cloud speech service; receiving automatic speech recognition (ASR) results from the cloud speech service at the mobile device; and comparing the recorded speech with the received ASR results at the mobile device to identify one or more error conditions.

According to another aspect of the invention, a method of providing hands-free services using a mobile device having wireless access to computer-based services includes receiving speech at a mobile device from a vehicle occupant via a short-range communication connection; transmitting the received speech from the mobile device to a cloud speech service; receiving automatic speech recognition (ASR) results from the cloud speech service; determining that the received ASR results include one or more incorrectly identified speech terms; performing local speech recognition on the received speech using resources located at the mobile device; comparing the local speech recognition with the ASR results to detect when the local speech recognition correctly identified the incorrectly identified speech terms in response to the determination; and sending the results of the comparison to a central facility.

According to yet another aspect of the invention, a method of providing hands-free services using a mobile device having wireless access to computer-based services includes receiving speech from a vehicle occupant at an audio interface in a vehicle; sending the received speech from the vehicle to a mobile device via a short-range communication connection; recording the received speech at the mobile device; transmitting the recorded speech from the mobile device to a cloud speech service, wherein the recorded speech includes an indication to the cloud speech service that the recorded speech originated in the vehicle; receiving automatic speech recognition (ASR) results from the cloud speech service; determining that the received ASR results include one or more speech terms that have been incorrectly identified; performing local speech recognition on the recorded speech using an automatic speech recognition (ASR) system resident on the mobile device in response to the determination; comparing the local speech recognition with the ASR results to detect instances when the local speech recognition correctly identified the incorrectly identified speech terms; and maintaining a log of the incorrectly identified speech terms, the instances when the local speech recognition correctly identified the incorrectly identified speech terms, or both.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below provide a mobile voice platform that (1) enable hands-free communication between a vehicle occupant and the occupant's cellular phone or other mobile device without the need to physically interact with the mobile device, and (2) does so in a manner that enables broad support to some or all of the Internet-based and other computer-based services available to the user via the mobile device. As used herein, "services" generally include the provision of information, control, and/or communication assistance to the mobile device user. Further, as used herein, a service being used on or accessed via the mobile device includes those provided by way of applications installed on the mobile device as well as computer-based services that are only available by communication with a remote server. These latter computer-based services are also referred to as "cloud services" and may be supplied by any service provider having an accessible server that is available over a private or public network, such as an intranet or the Internet.

Figure 1:
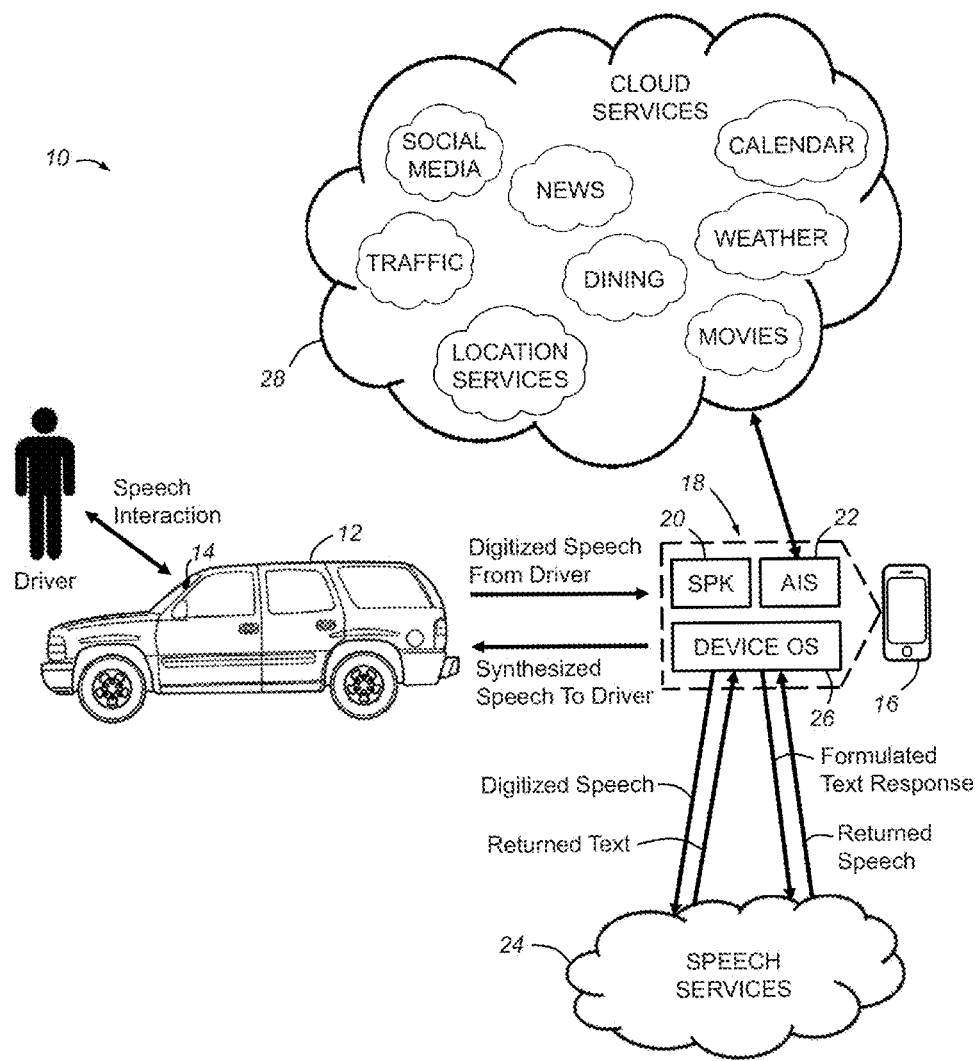
FIG. 1 diagrammatically depicts the portions of the hardware and methodology used to provide a speech user interface in accordance with an embodiment of the invention.

FIG. 1 depicts one embodiment of a speech-based user interface 10 as it could be used for providing services via a mobile device to a vehicle driver in a hands-free manner. As used herein "hands-free" means that the user can or has carried out some or all of a completed speech-based session using the mobile device without physical interaction or control of the device. "Fully hands-free" means that the user can or has carried out all of a completed speech-based session using the mobile device without physical interaction or control of the device. Some embodiments can be implemented to provide a hands-free experience that may require some interaction with the mobile device, such as to place it in a listening mode, while other embodiments can be carried out fully hands-free while, for example, the mobile device is in the user's pocket, purse, or briefcase, with no physical access needed to the device.

In the illustrated embodiment, a driver of a vehicle 12 interacts via speech with an on-board, installed audio user interface 14 that communicates via a short range wireless connection with the driver's mobile device 16, which in this case is a cellular phone. Mobile device 16 can be any portable device capable of wireless communication and digital processing whether using a microprocessor or some simpler or more complex circuitry. Thus, mobile devices include cellular phones, PDAs, laptops, notebooks, netbooks and other personal electronic devices. The cellular phone 16 depicted in FIG. 1 is commonly referred to as a smartphone given that it permits the user to add software applications (apps) to the smartphone that perform functions beyond telephony. Phone 16 includes a touchscreen interface, one or more manual pushbuttons, a microphone, speaker, and internal circuitry (hardware) including a microprocessor, memory for storage of software and data, and communication circuitry that includes at least short range wireless communication technology such as Bluetooth and/or WiFi, but also cellular communication technology such as a cellular chipset for CDMA, GSM, or other standardized technology. These various components of mobile device 16 may be conventional if desired, and thus are not separately illustrated or described in detail herein.

Apart from the mobile device hardware, cellular phone 16 includes a mobile voice platform (MVP) 18 comprising software running on the mobile device. MVP 18 includes a speech platform kernel (SPK) 20 and an application interface suite (AIS) 22, both of which are program modules comprising computer instructions that, upon execution by the device's processor, carry out their respective module's functions, as will be described below. Rather than providing automated speech processing (ASR) on the mobile device itself, remotely located (cloud) speech services 24 are used, although in some embodiments ASR can be carried out on the mobile device 16, either with or without access to remotely located speech modules, grammars, and computing facilities. Mobile device 16 also includes an operating system (OS) 26 that provides root level functions, including for example inter-application communication mechanisms and input/output (I/O) interfacing between device hardware and the software modules and applications running on device 16. Included in these hardware interfacing functions of the OS are the communication protocols used by the device to communicate with the speech services 24 as well as other cloud services 28 that are available via the Internet or other network. Any computer-based service can be included in the list of cloud services 28, but shown in FIG. 1 are some of those services most useful to users of cellular phones; i.e., social media, location services (e.g., navigation), traffic, weather, news, calendaring, dining, and movies. Many others exist.

In general, hands-free access to services using mobile voice platform 18 will involve carrying out a completed speech session via mobile device 16 without any physical interaction with the mobile device. This broadly includes receiving a speech input from a user, obtaining a service result from a cloud service that is responsive to the content of the speech input, and providing the service result as a speech response presented to the user. Using vehicle 12 of FIG. 1, the driver (user) may interact with the mobile device to carry out the speech session via the audio interface 14. This may include establishing a short range wireless connection between the in-vehicle audio interface 14 and mobile device 16 that then allows the microphone and speaker of the audio interface to be used to receive and present speech, respectively, to the driver or other occupant. The speech input may be sent as digitized speech over this short range wireless connection via a digital communication protocol such as Bluetooth or WiFi. The digitized speech input may then be sent from the mobile device 16 via a cellular or other wireless communication system to the speech services 24 to carry out speech-to-text (STT) services that involve automated speech recognition, or text-to-speech (TTS) services that provide either synthesized or recorded speech or speech portions (e.g., phonemes) for use in generating an audio message that provides a suitable speech response to the speech input. The speech recognition results (e.g., returned text) is then processed by the SPK 20 to ultimately determine the appropriate (desired) service to be used to carry out the user's request. Once the desired service(s) have been determined, a service request is formed using the commands and parameters supported by the particular service selected using one or more service interfaces from the application interface suite (AIS) 22, as will be discussed in greater detail below. The service request is sent to the desired service (installed app and/or cloud service) and a service result is received back. That service result is then used to generate a natural language speech response; that is, using conversational language and sentence/clause structures that are familiar and context-specific. The speech response may be an audio message that is initially built as a text response from information in the service result as well as from other available information such as session variables and context-specific items, as will be discussed in greater detail below. Once the text response has been formulated, it is converted to an audio speech response (e.g., audio message), and this can be done either on the mobile device 16 itself, or using the TTS services 24. The audio message may then be sent from the mobile device to the audio user interface 14 via the short range wireless connection for presentation to the vehicle occupant over the vehicle speaker(s).

Figure 2:
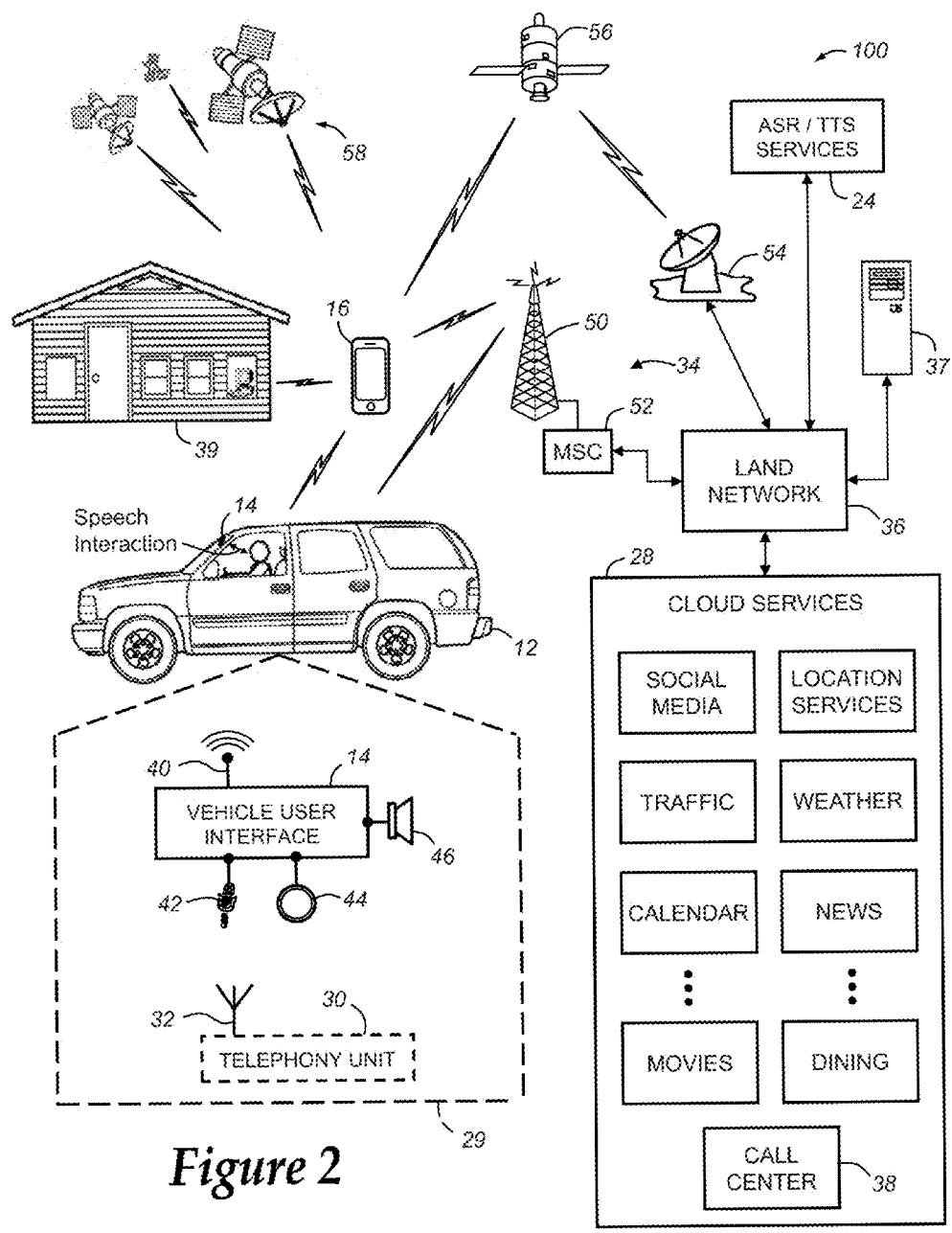
FIG. 2 is a block diagram depicting an embodiment of a communications system that is capable of utilizing the speech user interface of FIG. 1 as well as the methods disclosed herein.

Turning now to FIG. 2, there is shown an operating environment that comprises a mobile vehicle communications system 100 that incorporates the speech-based user interface (SUI) 10 and that can be used to implement the methods disclosed herein. Communications system 100 generally includes the vehicle 12 and its audio user interface 14, mobile device 16, speech services 24, and cloud services 28, as well as some of the system infrastructure not shown in FIG. 1, including one or more wireless carrier systems 34 and a land communications network 36. Other optional equipment, facilities, and systems can be included, such as a computer 37, call center 38, residence or other fixed local area network facility 39, satellite communication system with fixed antenna 54 and one or more satellites 56, and also a constellation 58 of GPS satellites for navigation. It should be understood that the disclosed method can be used with any number of different systems and is not specifically limited to the operating environment shown here. Also, the architecture, construction, setup, and operation of the components of system 100 not described herein are generally known in the art. Thus, the following paragraphs simply provide a brief overview of one such communications system 10; however, other systems not shown here could employ the disclosed method as well.

Vehicle 12 is depicted in the illustrated embodiment as a sports utility vehicle (SUV), but it should be appreciated that any other vehicle including passenger cars, trucks, motorcycles, recreational vehicles (RVs), marine vessels, aircraft, etc., can also be used. Some of the vehicle electronics 29 are shown generally in FIG. 2 and include a telematics or telephony unit 30 that communicates wirelessly with carrier system 34 via an antenna 32 and other circuitry known to those skilled in the art. Vehicle electronics 29 also include the audio user interface 14 which includes an antenna 40 for short range wireless communication, a microphone 42, one or more pushbuttons or other control inputs 44, and one or more speakers 46. Other user interface components can be included in the vehicle or as a part of the audio user interface 14, such as a visual display (not shown). The audio user interface 14 may be a substantially standalone set of components communicating only via antenna 40, or may be hardwired or otherwise connected into other modules or portions of the vehicle's electronics system, such as to telephony unit 30 and/or a vehicle bus. This may permit, for example, the vehicle to be programmed so as to reduce ambient noise during a speech session such as by, for example, reducing the climate control fan speed, quieting the vehicle radio, etc. As used herein, the term "audio user interface" broadly includes any suitable installation of a microphone and speaker in the vehicle, including both hardware and any software components, which enables a vehicle user to communicate verbally with the vehicle or other devices in the vehicle, such as mobile device 16. Microphone 42 provides audio input that can be sent via the short range wireless connection using antenna 40. One or more pushbutton(s) 44 allow manual user input into the audio user interface to initiate actions such as the start of a speech session in which the microphone 42 and speaker 46 are used to provide the user with hands-free services in the vehicle such as to carry out wireless telephone calls or access data, provide remote control or provide messaging and communication services. The pushbutton may be located in a convenient spot for the driver, such as on the steering wheel hub or spokes. Speaker 46 may be a single speaker dedicated for use with the audio user interface 14 or may be integrated with other components or systems, such as a radio system speaker.

In the illustrated embodiment, telephony unit 30 is an optional component that is not used in carrying out the operation of the speech user interface (SUI) 10, but in other embodiments can be included and can be integrated in with the audio user interface as a single functional module. Telephony unit 30 can be an OEM-installed (embedded) or aftermarket device that is installed in the vehicle and that enables wireless voice and/or data communication over wireless carrier system 34 and via wireless networking. This enables the vehicle to communicate with call center 38, other telematics-enabled vehicles, or some other entity or device. The telephony unit preferably uses radio transmissions to establish a communications channel (a voice channel and/or a data channel) with wireless carrier system 34 so that voice and/or data transmissions can be sent and received over the channel. By providing both voice and data communication, telephony unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 38) and data communication (e.g., to provide GPS location data or vehicle diagnostic data to the call center 38), the system can utilize a single call over a voice channel and switch as needed between voice and data transmission over the voice channel, and this can be done using techniques known to those skilled in the art. For location services, the telephony unit may have its own GPS circuitry, or can utilize other available GPS devices, such as one installed in the vehicle as a part of a vehicle navigation system, or using one from the mobile device 16.

Wireless carrier system 34 is preferably a cellular telephone system that includes a plurality of cell towers 50 (only one shown), one or more mobile switching centers (MSCs) 52, as well as any other networking components required to connect wireless carrier system 34 with land network 36. Each cell tower 50 includes sending and receiving antennas and a base station, with the base stations from different cell towers being connected to the MSC 52 either directly or via intermediary equipment such as a base station controller.

Cellular system 34 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 34. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 34, a different wireless carrier system in the form of satellite communication can be used to provide uni-directional or bi-directional communication with the vehicle. This can be done using one or more communication satellites 56 and an uplink transmitting station 54. Uni-directional communication can be, for example, satellite radio services, wherein programming content (news, music, etc.) is received by transmitting station 54, packaged for upload, and then sent to the satellite 52, which broadcasts the programming to subscribers. Bi-directional communication can be, for example, satellite telephony services using satellite 56 to relay telephone communications between the vehicle 12 and station 54. If used, this satellite telephony can be utilized either in addition to or in lieu of wireless carrier system 34.

Land network 36 may be a conventional land-based telecommunications network that is connected to one or more landline telephones and connects wireless carrier system 34 to such things as speech services 24, cloud services 28, and other computers or servers 37, such as a personal computer located in a residence 39 or other facility. For example, land network 36 may include a public switched telephone network (PSTN) such as that used to provide hardwired telephony, packet-switched data communications, and the Internet infrastructure. One or more segments of land network 36 could be implemented through the use of a standard wired network, a fiber or other optical network, a cable network, power lines, other wireless networks such as wireless local area networks (WLANs), or networks providing broadband wireless access (BWA), or any combination thereof. Furthermore, the various speech and cloud services shown in FIG. 2 need not be connected via land network 36, but could include wireless telephony equipment so that it can communicate directly with a wireless network, such as wireless carrier system 34.

Computer 37 can be one of a number of computers accessible via a private or public network such as the Internet. Each such computer 37 can be used for one or more purposes, such as a web server accessible by the vehicle over wireless carrier 34 via audio user interface 14/mobile device 16, and/or via telephony unit 30. Other such accessible computers 37 can be, for example: a service center computer where diagnostic information and other vehicle data can be uploaded from the vehicle via the telephony unit 30; a client computer used by the vehicle owner or other telematics service subscriber for such purposes as accessing or receiving vehicle data or to setting up or configuring subscriber preferences or controlling vehicle functions; or a third party repository to or from which vehicle data or other information is provided. A computer 37 can also be used for providing Internet connectivity such as DNS services or as a network address server that uses DHCP or other suitable protocol to assign an IP address to the vehicle 12 and/or to the mobile device 16. When used as a client computer 37 by the vehicle owner, such as within a residence 39, wireless connectivity between the mobile device 16 and computer 37 may be provided using any suitable short range wireless communication technology, such as Bluetooth or any of the 802.11 protocols.

Shown in FIG. 2 as one of the cloud services is a call center 38 which can be used to provide the vehicle operator and/or the vehicle electronics 29 with a number of different vehicle-related services and system back-end functions. These include such things as roadside or emergency assistance, diagnostic and maintenance support, entertainment services, information and navigation assistance, etc., as is known in the art. These call center services can be provided to supplement those accessible to the vehicle operator via the speech user interface 10, or as a backup in case the operator is having difficulty with the speech user interface.

Figure 3:
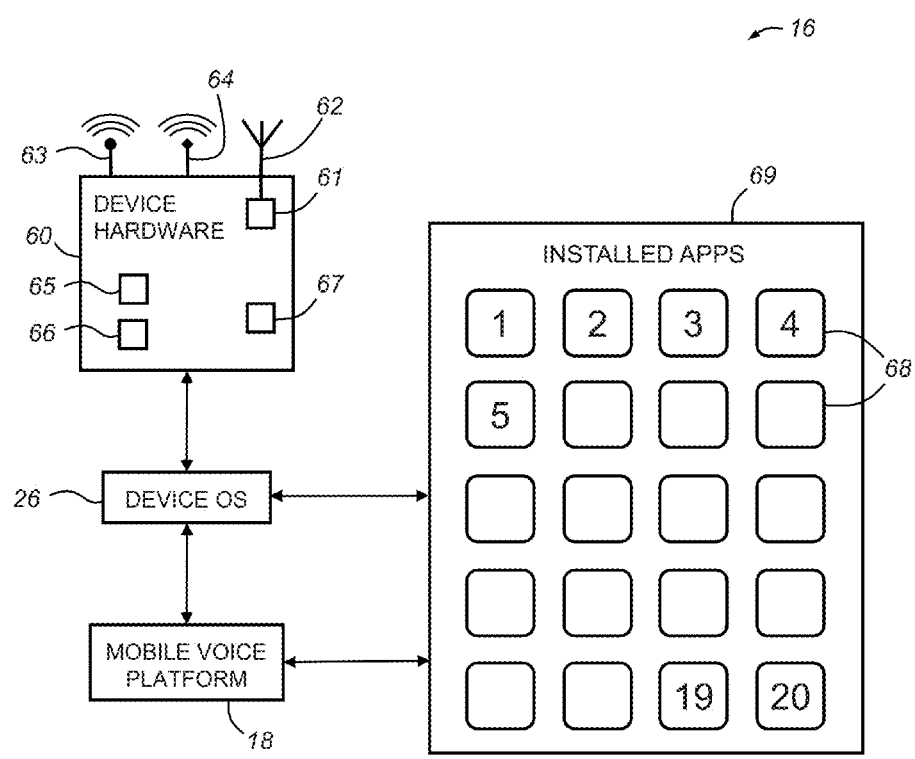
FIG. 3 is a block diagram of some of the hardware and software components of the mobile device depicted in FIGS. 1 and 2.

Although shown outside the vehicle in FIGS. 1 and 2 solely for diagrammatic illustration, the typical use of the mobile device 16 as a part of the speech user interface 10 will involve circumstances in which the mobile device in located in the vehicle, such as when the driver is operating the vehicle on the roadway. Some of the basic functional hardware and software components of mobile device 16 are depicted in FIG. 3. According to the embodiment shown, mobile device 16 is a smartphone that utilizes cellular communication according to GSM and/or CDMA standards and thus includes a standard cellular chipset 61 and antenna 62 for voice and data communications, antenna 63 and 64, and their associated circuitry for Bluetooth and WiFi wireless connections, respectively, an electronic processing device 65, one or more digital memory devices 66, and a GPS receiver 67.

Processor 65 can be any type of device capable of processing electronic instructions including microprocessors, microcontrollers, host processors, controllers, vehicle communication processors, and application specific integrated circuits (ASICs). Processor 65 executes various types of digitally-stored instructions, such as software or firmware programs stored in memory 66. This includes the device OS 26, the mobile vehicle platform 18, and any installed apps 68, all of which can be stored in memory 66.

GPS module 67 receives radio signals from a constellation 58 of GPS satellites. From these signals, the module 67 can determine mobile device position that is used for providing navigation and other position-related services. Navigation information can be presented on the device's display 69 or can be presented verbally via the device's own speaker (not shown) or via the audio user interface 14, such as may be done for supplying turn-by-turn navigation.

In general, the speech user interface 10 may be realized in part using the mobile voice platform 18 that runs on the device OS 26 and interfaces with installed apps 68, cloud services 28, or both to carry out services for the user based on their speech input. Further details of the mobile voice platform and its interaction with the other components of mobile device 16 are shown in FIGS. 4 and 5.

Figure 4:
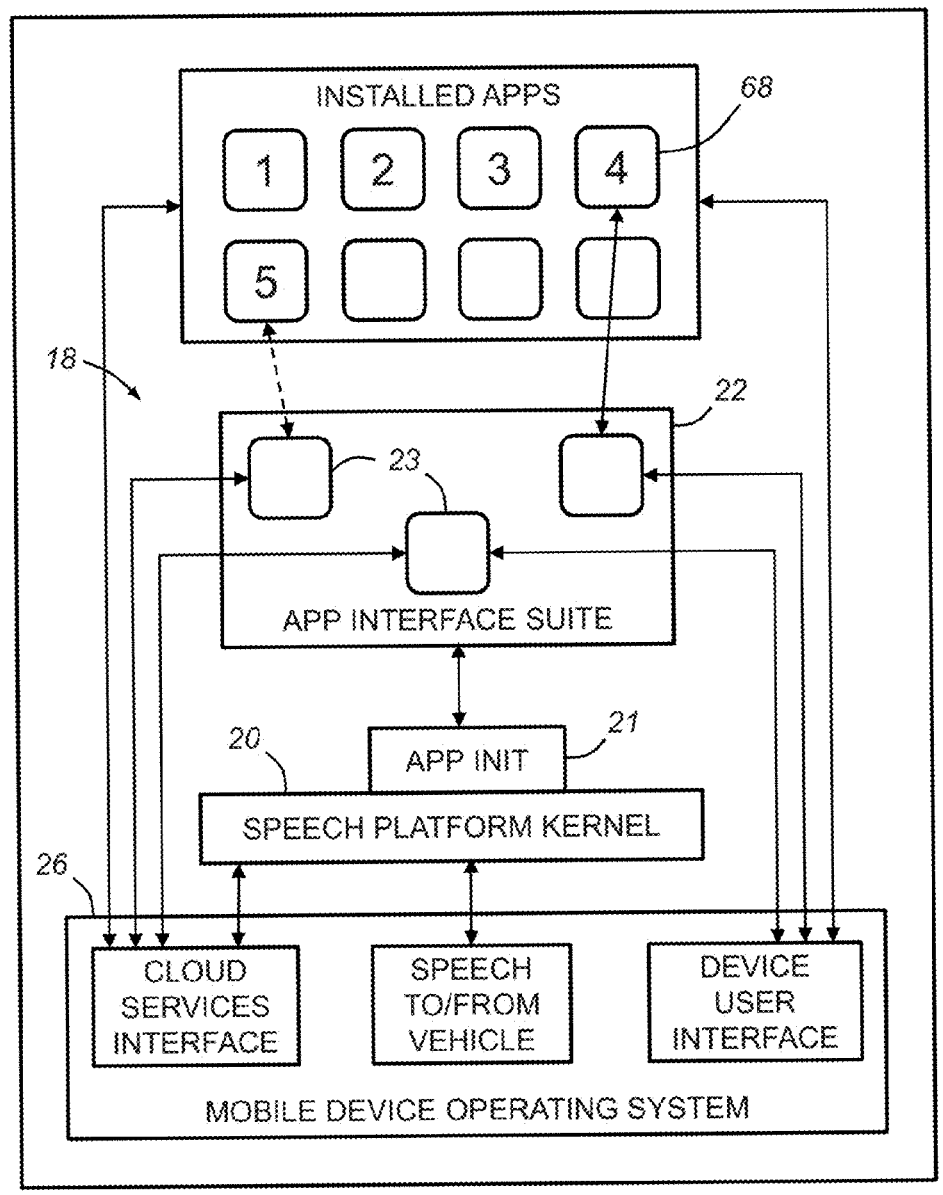
FIG. 4 depicts the tiered software structure and program module interactions of the mobile voice platform and operating system used on the mobile device of FIGS. 1-3.
Figure 5:
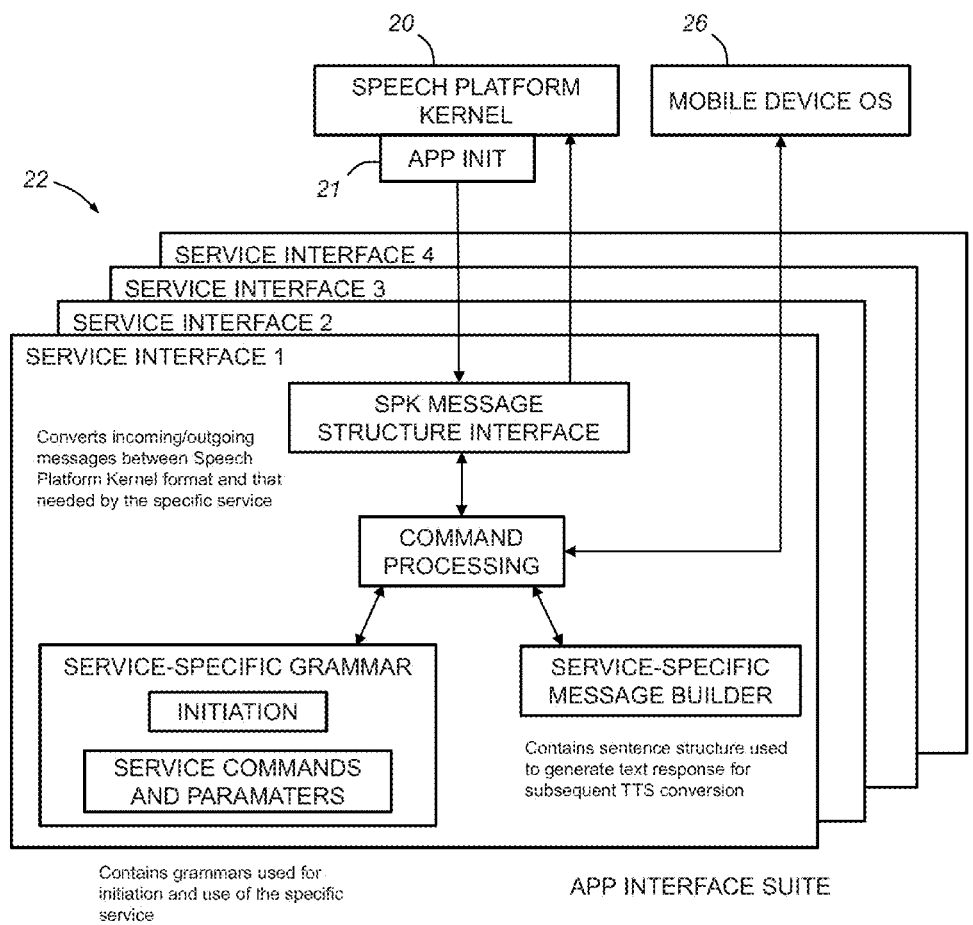
FIG. 5 depicts further details concerning the structure of service interfaces used in the application interface suite of FIG. 4.

FIG. 4 depicts different program modules each of which provide computer instructions that, upon execution by the processor 65, carry out their programmed functions using the device OS 26 to interface with the various hardware portions of the device 16. The mobile voice platform 18 includes the speech platform kernel (SPK) 20 and app interface suite (AIS) 22. SPK 20 includes an app initiator module 21 that is used to initiate a service call from SPK 20 to a service on the device (e.g., one of the apps 68) or in the cloud (e.g., one of the cloud services 28). AIS 22 includes a number of individual application service interfaces 23, each of which is associated with one of the different services available to mobile voice platform 18. The individual functions performed by the different layers is as follows:

Device OS 26:
Provides underlying communication with Bluetooth and device connectivity controls
Provides mobile device media player function for causing audio files to play through the speakers
Provides microphone-driven speech recognition system for converting spoken speech into a text equivalent
Provides inter-application communication mechanisms Speech Platform Kernel 20:
Manages all high-level Bluetooth integration with the vehicle 12
Maintains control over audio and microphone channels, including audio focus and gain levels which can be adjusted by SPK 20 as desired or necessary
Provides consistent vocabulary and mechanisms for dealing with common voice interactions such as failure, pardon (didn't quite understand you), and quitting
Processes converted speech-to-text into command structures for use by apps
Maintains high-level app preferences related to Bluetooth devices, request management
Provides logging and security management Service Interfaces 23:
Each interfaces with at least one of the different services (e.g., apps) on the mobile device to provide communication with SPK 20, device OS 26, or both
Uses a standardized command/parameter I/O protocol to interface with SPK
Defines the grammars it supports for initiation
Defines the grammars it supports when app is active
Processes incoming speech-to-text command structures provided by SPK 20 and converts them into desired actions
Connects to cloud services in order to send and receive information needed to process request
Provides any desired device display 69 user interface As indicated above and in FIG. 4, SPK 20 runs on top of the operating system 26 and handles the overall control and routing of messaging used for the mobile voice platform. SPK 20 controls the basic process flow of the speech session according to the methodology discussed above in connection with FIG. 1 and shown in FIGS. 6-8. During a speech session in which an input (e.g., request or command) is received from a user, SPK 20 handles speech processing of the speech recognition results returned by the cloud-based automated speech recognition (ASR) service. This is done using a post-ASR service-identifying grammar specifically designed with a vocabulary intended to identify a desired service or session context from the speech recognition results. Built into this functionality is error handling and building of natural language responses for returning a speech response to the user. A session context (e.g., navigation v. messaging v. dining reservations) may also be determined at SPK 20 using this first grammar, and the session context can be used to further restrict the choice of services selected by SPK 20, or to aid in the post-ASR processing of the speech recognition result. Each speech session has at least one context; that is, at least one subject matter domain to which the user's speech input relates. The different cloud services shown in FIGS. 1 and 2 indicate some of the various session contexts that can be identified and distinguished. For any speech session, there may be a primary session context and one or more ancillary service contexts. For example, making dining reservations might invoke a dining session context in which the primary message contents being sought for include an identification of restaurant, number of people in the party, reservation time, etc. But it may also invoke a navigation context wherein directions to the restaurant are desired. Or a message context in which notification of the reservation is shared with others. SPK 20 not only determines a primary session context, but one or more ancillary ones, if appropriate, and for each, identifies an appropriate cloud or installed service.

The speech services identified in FIGS. 1 and 2 can be implemented in various ways and in some embodiments, may be uniquely designed or contain specific grammars or models designed to support the speech user interface 10. In other embodiments, a generalized cloud ASR service is used; that is, one in which, although it may permit parameter specifications for particular language models and other general configurations of the speech recognition engine, does not use a grammar tailored to the session contexts expected for the user speech session. The android.speech functionality available from Google is one example of a generalized cloud ASR service.

Once SPK 20 has identified or otherwise determined a desired service, it uses the App Init 21 to start the selected service via a service interface 23 associated with that service. As indicated in FIG. 4, some of the service interfaces 23 interact only with cloud services, or only with cloud services and the device user interface (e.g., display 69), whereas others interface with the installed apps (e.g., app 4) that itself may access cloud services using the operating system's interface to the cloud services. This permits each service interface to carry out the selected service as desired so that, for example, if a particular service desires to use the display 69 of the mobile device, the service interface can define the particular user interface to be displayed.

Turning now to FIG. 5, further detail of the service interfaces 23 is shown. Each service interface 23 includes a SPK message structure interface that follows the standardized I/O protocol used by SPK 20 for messaging to the service interfaces. This provides a common framework for interacting with the mobile voice platform so that new services can be accessed by creating a service interface that meets the SPK 20 I/O specification while identifying to SPK 20 the commands and parameters needed to call and receive results from the service. The service interface includes command processing that uses a service-specific grammar to construct a service request and then send that service request to the cloud service or installed app via the OS 26. The service request will typically include any needed command from the service interface plus at least a part of the recognized speech results (e.g., a particular restaurant name) or associated data (e.g., GPS coordinates). The service-specific grammar is one that includes vocabulary used for initiating and commanding the service and will typically be different for each different computer-based service.

The App Init module 21 of SPK 20 can be implemented with the same structure as the service interfaces, except that it is a special purpose interface that is used by SPK 20 to contact a selected service interface to initiate the service and pass the needed commands and parameters used by the service.

Figure 6:
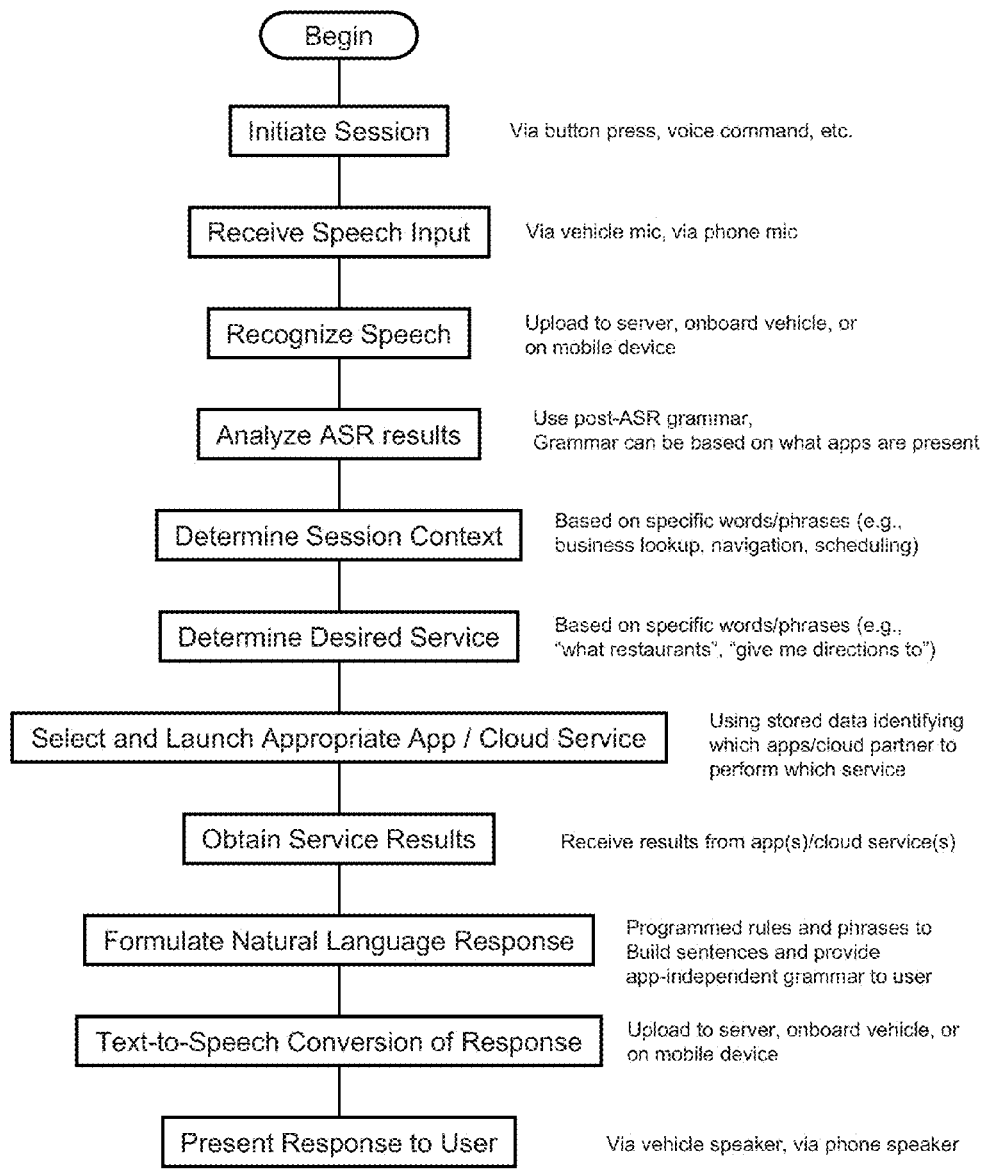
FIG. 6 is a flowchart of a method that can be used with the speech user interface of FIGS. 1 and 2 to provide a user with a completely hands-free speech session.

FIG. 6 depicts a flowchart of a complete speech session that can be used to provide hands free or even fully hands free operation of the mobile device by a driver in a vehicle.

Figure 7:
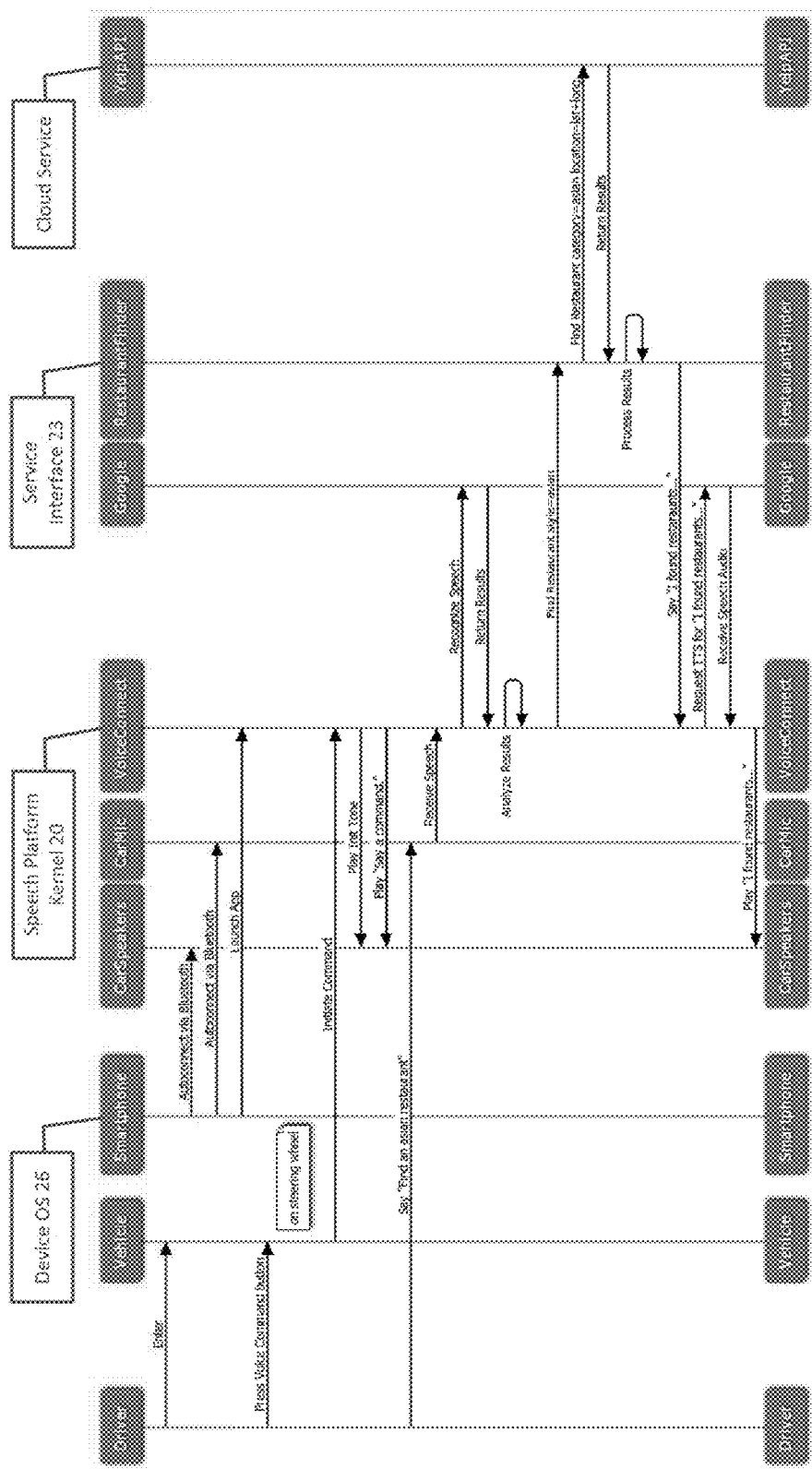
FIG. 7 is a sequence diagram showing messaging flows for a sample speech session.
Figure 8A:
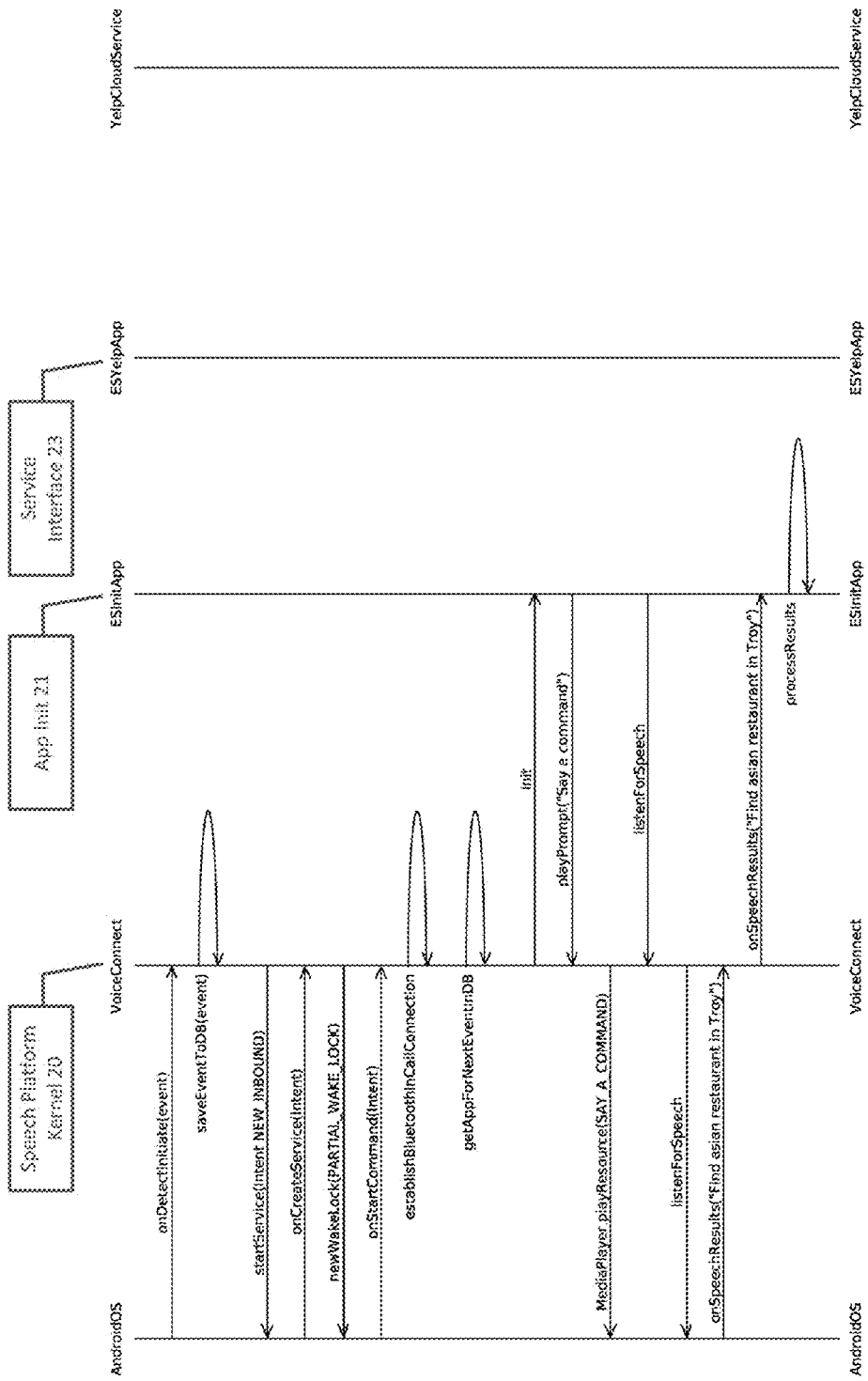
FIG. 8 comprises FIGS. 8A and 8B and is another sequence diagram showing messaging flows for another sample speech session.
Figure 8B:
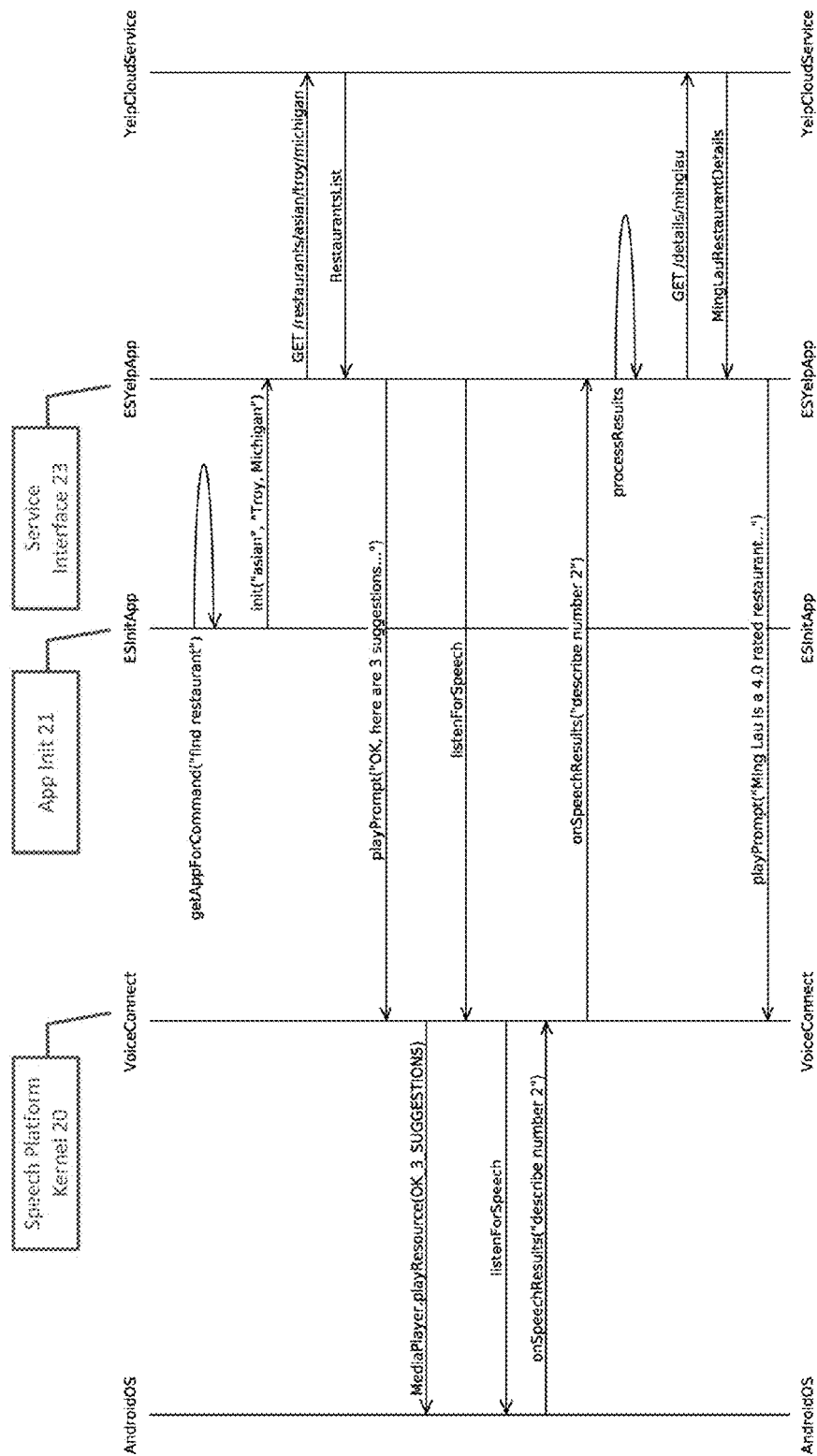

FIGS. 7 and 8 provide more detailed examples of a completed speech session showing the various inter-module and inter-device calls and sequences to request a service, obtain a result, and provide it to the vehicle driver, all via the audio user interface 14.

Figure 9:
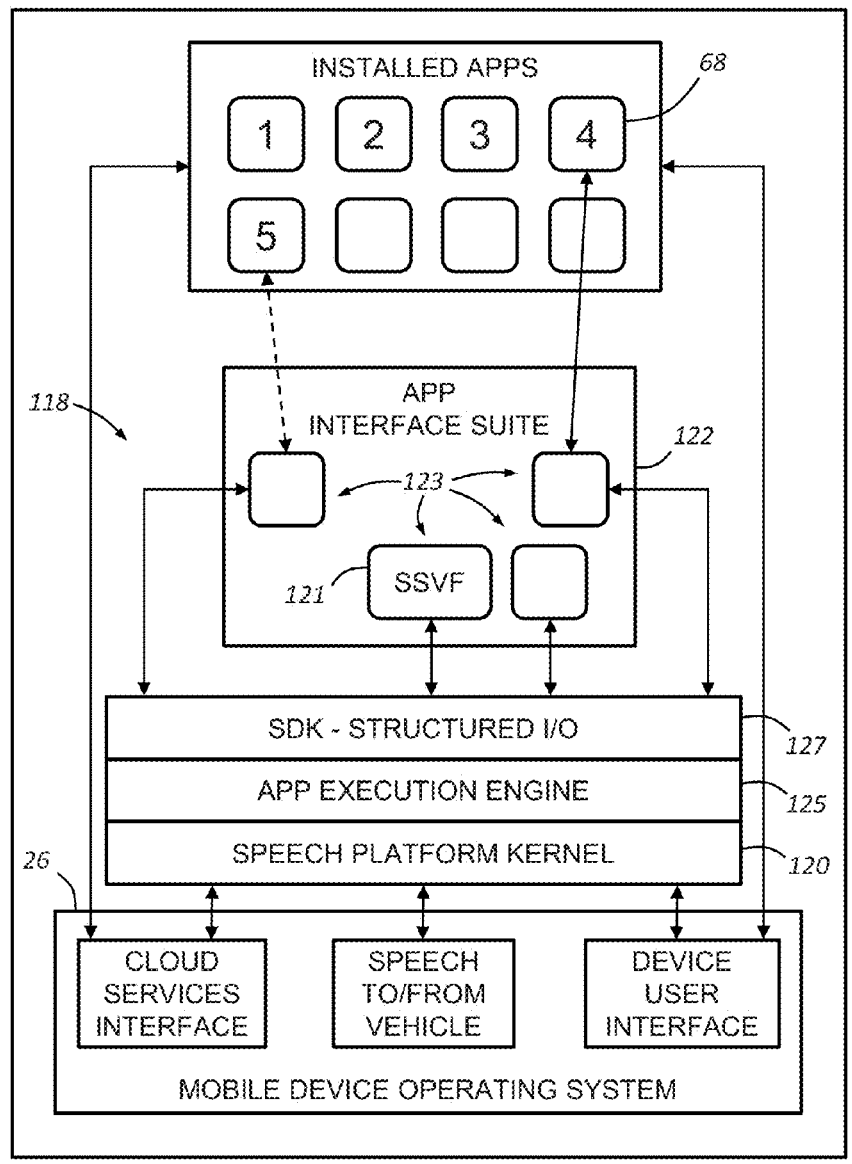
FIG. 9 depicts an alternative embodiment of the tiered software structure and program module interactions shown in FIG. 4.

FIG. 9 depicts an alternative embodiment of the software architectural design, wherein like reference numerals denote like elements from FIG. 4. This embodiment 118 of the mobile voice platform is similar to FIG. 4 in that it includes a first program module (SPK 120) and second program module (AIS 122), but uses the individual service interfaces 123 to define the voice flow needed for a particular service to the which the service interface relates. This is done using scripts that define the handling of speech recognition results, calls to the cloud (computer-based) service, and handling of additional minimally-required or otherwise desired information. For example, requesting a reservation for dinner at a particular restaurant at 6:00 pm leaves out what may be considered minimally-required information; namely, the number of people in the party. The service interface 123 associated with the requested dining reservation service may include programming to determine the missing information and provide a response message (such as "how many in your party?"), which may then be provided to SPK 120 for conversion to speech and presentation to the user via the OS 26. As with SPK 20 discussed above, SPK 120 may also provide common grammar and constraints as well as common responses that are used at least somewhat independently of the particular service being accessed so that similar or identical queries or responses from different services that are phrased differently may be converted by SPK 120 into common phrases or grammar. As one example, two different services may provide different queries for the same information (e.g., "how many people" versus "what size is your party") could be translated by SPK 120 into a common phrase (e.g., "how many are in your party").

Operation of the service interfaces 123 can be by way of an app execution engine 125 that provides a runtime execution environment for the service interfaces. An SDK (software developer kit)—defined protocol 127 provides a set of standard or common input/output tags or other identification of the data and commands passed between SPK 120 and the service interfaces 123. This can be done, for example, using VXML, wherein SPK 120 tags the individual portions of the received speech recognition results using SDK protocol 127 and, in some embodiments can convert them to a smaller vocabulary that is at least partially shared among the service interfaces. For example, "a restaurant in the area" as speech input may be broken down into "restaurant" being tagged as the desired service or session context, and "in the area" being converted (as are such other general location terms—"around here", "near me", etc.) into a single term "nearby" which is supported by all of the service interfaces for which location is used to carry out the service.

One of the service interfaces 123 may be a speech session voice flow (SSVF) 121 that may perform the same or similar functionality of App Init 21 of FIG. 4. Thus, when a speech session is begun (e.g., by an input to the mobile device 16 directly by the user or via a button press in the vehicle that is used to signal the mobile device 16 via its short range wireless communication circuitry 63), SPK 120 can initially invoke the SSVF script which defines the voice flow for the speech session communication with the user. For example, it can specify that the user is prompted with the statement "Please say a command" and then can define the actions taken based on the response all the way up until a desired service is identified and the associated service interface invoked.

Figure 10:
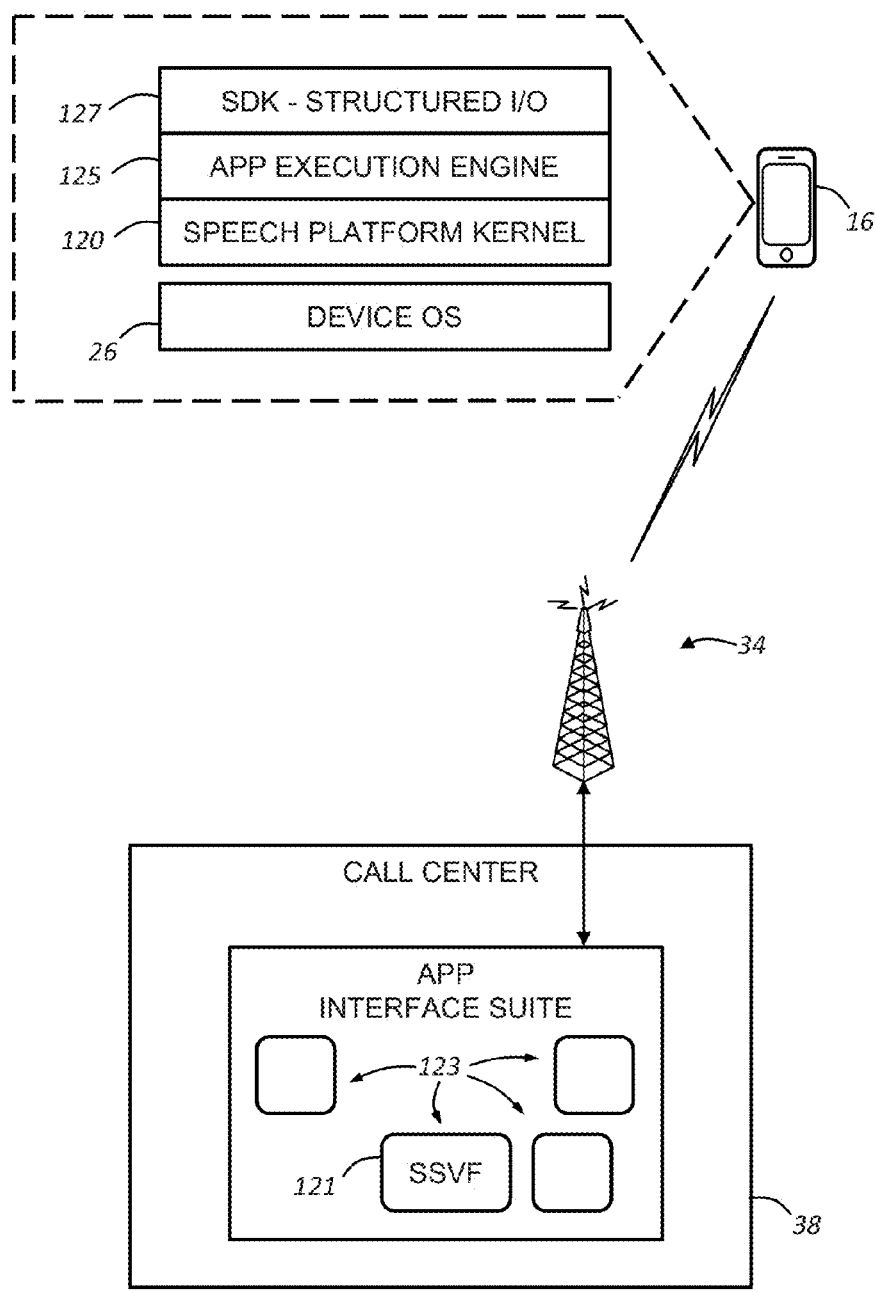
FIG. 10 depicts a modified implementation of the embodiment of FIG. 9.

The various program modules shown in the figures can be stored in one or more non-transient memories 66 (e.g., flash memory) on the mobile device 16 as computer instructions that, upon execution by the processor 65, carries out the functions described above. In other embodiments, at least some of the program modules may be stored remotely, such as on a remote server or other computer and accessed as necessary. For example, as shown in FIG. 10, the app interface suite (AIS) 122 can be stored at a remote location such as the call center 38, or at some other remote facility or computer. Then, when SPK 120 needs any of the service interfaces, such as SSVF 121 at the start of a speech session, it can remotely access the service interface via the cellular carrier system 34, download it, and run it locally at the mobile device 16 using the app execution engine 125. Similarly, once a desired service is identified, the associated service interface 123 can be remotely accessed, downloaded to the mobile device, and again run to implement the desired service, including generating the needed service request used to interface with a particular remote computer-based service (e.g., via the service's API). An advantage of this remote storage of the service interfaces is that they can be maintained and updated as desired, whereas if they are stored normally on the mobile device, they will need to be periodically updated which, for some mobile device platforms, may require obtaining user consent each time. With remote storage, if there is a change to be made to the service interface (e.g., because the associated service has been enhanced) then only the single version at the call center or other remote location needs to be updated and users will receive the latest version each time they provide a speech command or request that utilizes the service. This also allows the voice interaction defined by the service interface to be updated as desired so that, for example, if it is desirable to change SSVF 121 from saying "Please say a command" to "What can I help you with today?", this can be done back at the call center, again without users each needing to have the software on their mobile device updated. Remote storage and maintenance of AIS 122 or individual service interfaces 123 can all be maintained together (e.g., at a single server or group of servers) or at least some may be separately maintained (e.g., by different third party entities). In this regard, the different service interfaces 123 corresponding to different services (e.g., apps on the mobile device) could be produced, stored, and updated by the different third parties who created the associated service (app).

Access and use of the service interfaces 123 may be carried out in any of a number of different ways, at least some of which will be apparent to those skilled in the art. For example, as shown in FIG. 10, the AIS 122 may include a central registry 129 that, for each of at least some of the service interfaces 123, stores information concerning under what circumstances it is to be invoked (e.g., in response to determining what spoken request was given by the user) as well as how it is to be invoked (e.g., by executing it on the mobile device if stored locally, or by a URL or other address used for accessing it from a remote location). The central registry may be incorporated into AIS 122 (whether on the mobile device or remotely stored), or may be stored apart from the AIS 122. Known approaches for adding and removing registry entries for the different service interfaces 123 may be used.

Figure 11:
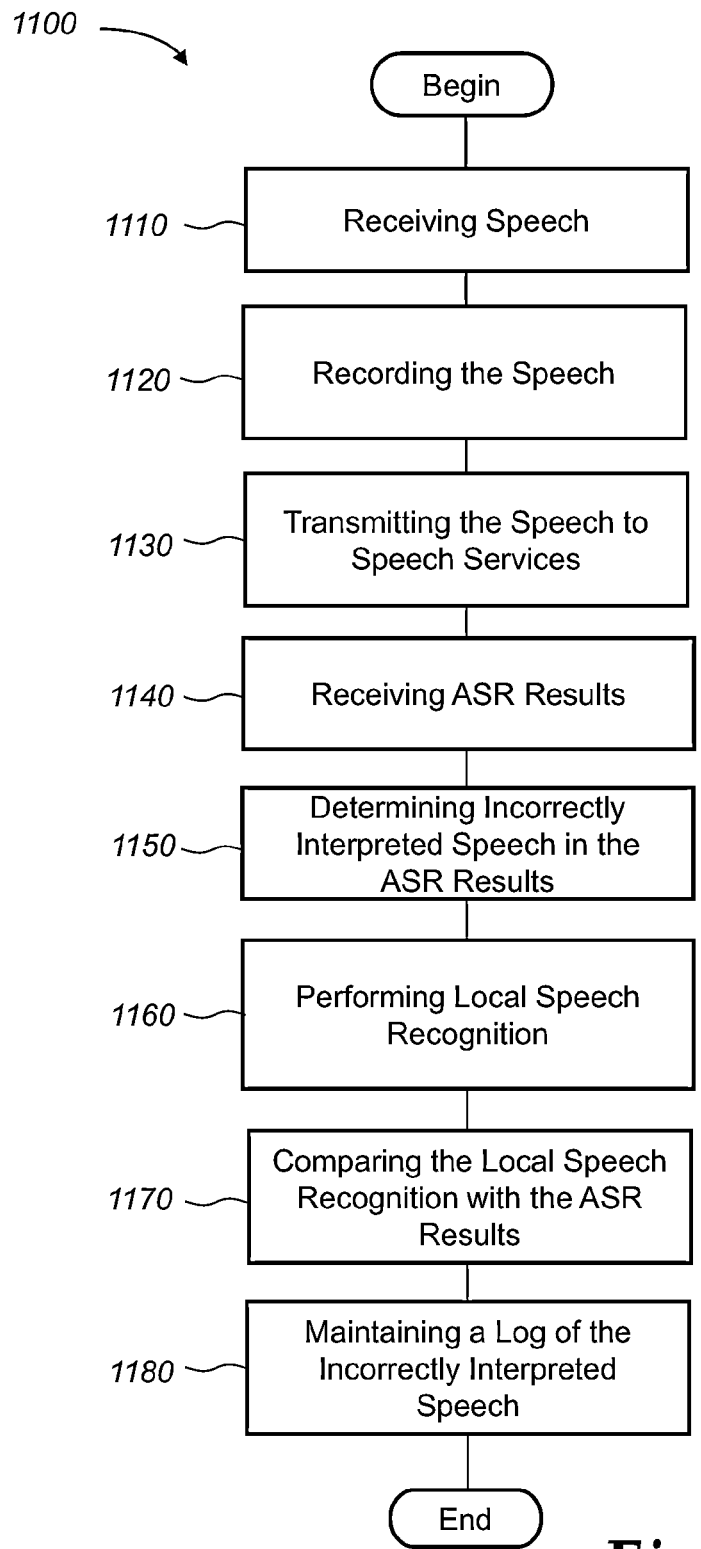
FIG. 11 is a flowchart of another method that can be used with the speech user interface of FIGS. 1 and 2 to provide a user with a completely hands-free speech session.

Turning to FIG. 11, a method of providing hands-free services using a mobile device 16 having wireless access to computer-based services is shown. The method 1100 begins at step 1110, during which speech is received in a vehicle 12 from a vehicle occupant. This speech can be received from a vehicle occupant at the audio interface 14 in the vehicle 12 as is discussed above. The speech can then be sent to the mobile device 16 from the vehicle 12 via the short-range wireless connection. The method 1100 proceeds to step 1120.

At step 1120, the received speech can be recorded at or using the mobile device 16. For example, when the audio interface 14 receives speech and sends it to the mobile device 16, the device 16 can record the received speech in memory 66. It is possible to temporarily store the received speech for a particular duration, such as the amount of time the mobile device 16 is linked to the vehicle 12 via the short-range wireless connection or the amount of time the user is accessing a particular application or "app." However, the received speech can also be recorded and stored in memory 66 for a longer period and ultimately sent to a central facility as will be discussed in more detail below As part of receiving speech at the vehicle 12, the speech can be identified as originating in the vehicle 12. That way, the speech can be effectively identified as likely including vehicle-specific vocabulary and speech recognition can recognize it as such. The method 1100 proceeds to step 1130.

At step 1130, the speech is transmitted from the mobile device 16 to the (cloud) speech services 24. The speech can be passed directly to the speech services 24 or can be recorded at/by the mobile device 16. In the former case, memory resources at the mobile device 16 can be conserved by sending the received speech directly to the speech services 24. It is possible that the speech services 24 can later return the received speech as an audio file along with the generated ASR results. Or in another example, the mobile device 16 can access the recorded speech and send it to the speech services 24 while maintaining (e.g., storing) the recorded speech at the mobile device 16. But regardless of whether the received speech is recorded, speech can be transmitted from the mobile device 16 to the speech services 24 via the wireless carrier system 34 and/or land communication network 36. The method 1100 proceeds to step 1140.

At step 1140, automatic speech recognition (ASR) results are received from the cloud speech services 24. As described above, speech services 24 can carry out speech-to-text (STT) services that involve automated speech recognition, or text-to-speech (TTS) services that provide either synthesized or recorded speech or speech portions for use in generating an audio message that provides a suitable speech response to the speech input. After passing the speech to the speech services 24, the mobile device 16 can receive the ASR result(s) in response. The method 1100 proceeds to step 1150.

At step 1150, the received ASR results are determined to include one or more speech terms that have been incorrectly identified, which results in an error condition. In some cases, the mobile device 16 receives the ASR results and no errors exist. The existence of errors can be determined in a number of ways. For example, the mobile device 16 can present an audibly-playable message reflecting the ASR results to the user (e.g., driver or vehicle occupant). Upon receiving these results, the user can respond by verbally agreeing with the results in which case the ASR results reflect an adequate answer to the query. On the other hand, the user may receive the ASR results and decide that these results do not adequately respond to the user's query. For example, the user may have spoken the a request, such as "where can I get a flat tire fixed?" yet the ASR results responded to that query by identifying one or more bicycle shops located near the user. While the user may have been expecting to receive the location of one or more vehicle service facilities, the ASR results might not have appreciated that the user provided the speech in the vehicle 12. The context in which the speech is given can be helpful to increase the accuracy of ASR results. In this regard, the grammar used to create the ASR results can be obtained along with the ASR results. The obtained grammar may not be optimized for recognizing vehicle-related queries. The manner in which the ASR results were generated can later be studied using the obtained grammar to determine if the grammar can be improved. That way, vehicle-related grammar or vocabulary can be added if it has been omitted. In other examples, the ASR results may misinterpret the vocabulary or grammar used in the query. For instance, the user may have asked to find the weather in "New York." However, the ASR results may include weather information for "Newark." Or the user can ask "how do I turn on the wipers?" and the ASR interprets this as "how do I turn on the vipers?" The user can then respond—verbally or otherwise—to the mobile device 16 and indicate that the ASR results are not correct. As part of this response, the user can be given an opportunity to verbally explain the error and that explanation or comment can be recorded or logged for further speech recognition processing. The mobile device 16 could also use ASR resources to automatically determine that vehicle-related vocabulary has been misinterpreted without user input. The method 1100 proceeds to step 1160.

At step 1160, local speech recognition is performed on the recorded speech using an automatic speech recognition (ASR) system in response to determining that one or more speech terms that have been incorrectly identified. Once it has been determined that the ASR results are not satisfactory, additional speech recognition processing apart from that performed by the speech services 24 can be carried out. Here, this has been described as local speech recognition but it should be appreciated that it is possible to carry this out not only at the mobile device 16 but alternatively at other places, such as at a centralized facility other than speech services 24 or at the vehicle 12 using ASR resources carried by the vehicle 12 (e.g., telephony unit 30). It is possible that the centralized facility could be realized using one of the cloud services 28, such as the call center 37, or using the computer 37 described above. And while local speech recognition has been described as being performed on recorded speech, it is possible that the speech services 24 provides the received speech (i.e., returns the speech it received) along with the ASR results thereby making it so recording the speech locally at the mobile device 16 is unnecessary. Using an example in which the mobile device 16 includes resources to perform speech recognition, it is possible to analyze the received speech to generate a local speech recognition result. The method 1100 proceeds to step 1170.

At step 1170, the local speech recognition is compared with the ASR results to detect instances when the local speech recognition correctly identified the incorrectly identified speech terms. And this comparison can then be sent to the speech services 24 so that the ASR results generated by services 24 can increase the likelihood that vehicle-related vocabulary will be correctly identified in the future. In one example, this can be carried out by comparing the local speech recognition results with the received ASR results at the mobile device 16 to identify one or more error conditions. The recorded speech can be analyzed using a local speech recognition grammar. The local speech recognition grammar may be optimized such that it is the result of recursive improvement based on past speech recognition analysis. That is, the local speech recognition grammar may include language unique to the user and/or environment.

And in some cases the local speech recognition grammar may help identify queries from users that the speech services 24 does not. The mobile device 16 can send the results of the comparison of local speech recognition to ASR results each time a comparison is made or can periodically send the updated local speech recognition grammar. Apart from optimizing the local speech recognition resources, the local speech recognition grammar may also include data that may not be accessible to the speech services 24. This data can include information resident at the mobile device 16, such as a list of contacts stored at the device 16.

In one example, the local speech recognition grammar may have been recursively trained or optimized to recognize an uncommon surname that the speech services 24 cannot. The local speech recognition resources may benefit from repeatedly analyzing unique words, such as the uncommon surname included with a list of contacts. In contrast, the speech services 24 may have never have interpreted the uncommon surname or at least not enough times to consistently recognize the word from speech. In this case, local speech recognition can generate it's interpretation of the uncommon surname and offer that interpretation to the user for confirmation. Once the user confirms that the local speech recognition is correct, the local speech recognition can send its result(s) to the speech services 24 for improving the accuracy of the cloud-based ASR.

It should be appreciated that it may not be necessary for the user to confirm the local speech recognition. For example, if the local speech recognition analyzes the error in the ASR results and returns a different result that has a confidence level rising above a predetermined threshold, the local speech recognition may forgo user confirmation and automatically send the local speech recognition result to the speech services 24. When this comparison is complete, the results from the local speech recognition can be sent to the central facility discussed above. The method 1100 proceeds to step 1180.

At step 1180, a log is maintained of the incorrectly identified speech terms, the instances when the local speech recognition correctly identified the incorrectly identified speech terms, or both. In an effort to improve the speech services 24 as well as the local speech recognition, the speech terms that have been incorrectly identified can be recorded in a log. This log can be maintained at the mobile device 16 and periodically communicated to the central facility, such as cloud service 28 or computer 37. In addition, or alternatively, the log could also be communicated to the speech services 24. As the logs from a plurality of mobile devices 16 are periodically sent to a central facility or location, the data from these logs can be aggregated and patterns in speech recognition errors can be identified. These aggregated logs can then be made available to third parties in an effort to improve speech recognition accuracy. The method 1100 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing hands-free services using a mobile device having wireless access to computer-based services, the method comprising the steps of:
   (a) receiving speech in a vehicle from a vehicle occupant using an audio user interface that is separate from the mobile device, wherein the audio user interface is communicatively linked directly to the mobile device via a short-range wireless connection;
   (b) recording the speech using the mobile device;
   (c) transmitting the recorded speech from the mobile device to a cloud speech service;
   (d) receiving automatic speech recognition (ASR) results from the cloud speech service at the mobile device;
   (e) determining that the received ASR results at the mobile device contain one or more error conditions;
   (f) obtaining a local speech recognition result, in response to the determination in step (e), by performing speech recognition on the speech received at the vehicle using a speech recognition resource that includes vehicle-related and/or user-related data that was not used by the cloud speech service in generating the ASR results; and
   (g) providing the local speech recognition result to the cloud speech service for use in improving subsequent recognition by the cloud speech service, wherein the local speech recognition result addresses the determined one or more error conditions.

2. The method of claim 1, further comprising the step of storing the recorded speech at the mobile device for a predetermined amount of time.

3. The method of claim 1, further comprising the step of receiving a verbal response from the vehicle occupant that triggers the comparing in step (e).

4. The method of claim 1, wherein step (f) is carried out by either the vehicle or mobile device.

5. The method of claim 1, wherein the speech recognition resource includes a local speech recognition grammar.

6. The method of claim 5, further comprising the step of optimizing the local speech recognition grammar using information gathered from a local environment or the vehicle occupant.

7. The method of claim 5, further comprising the step of recursively updating the local speech recognition grammar.

8. The method of claim 1, further comprising the step of sending the results of the comparison to a central facility.

9. The method of claim 1, further comprising the step of creating a log of the identified error conditions.

10. The method of claim 1, further comprising the steps of: receiving error conditions from a plurality of mobile devices at the central facility and generating an aggregate log based on the received error conditions.

11. The method of claim 1, wherein the local speech recognition result is provided to the cloud speech service without a user-supplied confirmation that the local speech recognition correctly identified the speech received at the vehicle.

12. The method of claim 11, further comprising determining the local speech recognition result corrected the error condition by exceeding a predetermined threshold confidence level.

13. A method of providing hands-free services using a mobile device having wireless access to computer-based services, the method comprising:
(a) receiving speech at a mobile device from a vehicle occupant via a short-range communication connection;
(b) transmitting the received speech from the mobile device to a cloud speech service;
(c) receiving automatic speech recognition (ASR) results from the cloud speech service;
(d) determining that the received ASR results include one or more incorrectly identified speech terms;
(e) performing local speech recognition on the received speech in response to the determination in step (d), including using a speech recognition resource at the vehicle to obtain a local speech recognition result, the speech recognition resource including vehicle-related and/or user-related data that was not used by the cloud speech service in generating the ASR results;
(f) comparing the local speech recognition with the ASR results to detect when the local speech recognition correctly identified the incorrectly identified speech terms in response to the determination in step (e); and
(g) sending the results of the comparison in step (f) to a central facility located remotely from the mobile device.

14. The method of claim 13, further comprising the step of receiving a grammar from the cloud speech service along with the ASR results.

15. The method of claim 13, further comprising the step of performing local speech recognition using a local speech recognition grammar.

16. The method of claim 13, further comprising the step of creating a log of the determination in step (d).

17. The method of claim 13, further comprising the steps of: receiving the results of step (g) from a plurality of mobile devices and generating an aggregate log based on those results.

18. A method of providing hands-free services using a mobile device having wireless access to computer-based services, the method comprising:
(a) receiving speech from a vehicle occupant at an audio interface in a vehicle;
(b) sending the received speech from the vehicle to a mobile device via a short-range communication connection;
(c) recording the received speech at the mobile device;
(d) transmitting the recorded speech from the mobile device to a cloud speech service, wherein the recorded speech includes an indication to the cloud speech service that the recorded speech originated in the vehicle;
(e) receiving automatic speech recognition (ASR) results from the cloud speech service;
(f) determining that the received ASR results include one or more speech terms that have been incorrectly identified;
(g) performing local speech recognition on the recorded speech using an automatic speech recognition (ASR) system resident on the mobile device in response to step (f) to obtain a local speech recognition result, the ASR system including data that is stored in the vehicle or mobile device and that was not used by the cloud speech service in generating the ASR results;
(h) comparing the local speech recognition with the ASR results to detect instances when the local speech recognition correctly identified the incorrectly identified speech terms; and
(i) maintaining a log of the incorrectly identified speech terms, the instances when the local speech recognition correctly identified the incorrectly identified speech terms, or both.

19. The method of claim 18, further comprising the step of receiving a grammar from the cloud speech service along with the ASR results.

20. The method of claim 18, further comprising the step of performing local speech recognition using a local speech recognition grammar.

* * * * *